July 14, 1942.      J. W. ANDERSON      2,290,140
WINDSHIELD WIPER ARM
Filed June 30, 1939

INVENTOR
John W. Anderson
BY Alois W. Graf
ATTORNEY

Patented July 14, 1942

2,290,140

UNITED STATES PATENT OFFICE 2,290,140

WINDSHIELD WIPER ARM

John W. Anderson, Gary, Ind., assignor to Productive Inventions, Inc., a corporation of Indiana Application June 30, 1939, Serial No. 282,008

9 Claims. (Cl. 15—250)

My invention relates to windshield wiper arms and more particularly to means located at the free end of said arm for engaging the connector of a windshield wiper blade.

In the present design of automobiles the windshield is generally formed of two portions set at angles to each other and at an angle to the vertical. In order to provide windshield wipers for such automobiles it has been customary to provide an actuating shaft for the windshield wiper arm and blade for each portion of the windshield. During the non-operating condition of the windshield wiper it is desirable that the windshield wiper blade be aligned with one of the lower edges of the windshield, and in order to accomplish this it has been necessary to bend a portion of the arm. Such arrangements, however, have numerous disadvantages both in manufacture and in operation since it has been found that in manufacture and replacement sale it is necessary to provide right and left windshield wiper arms. Furthermore, in operation these arms frequently have a tendency to become flexed or otherwise displaced sufficiently to cause improper and faulty operation of the windshield wiper blade.

Windshield wiper blades must turn at each end of the stroke of the arm in order to provide a desirable squeegee action on the return stroke. The angle at which the windshield wiper blade operates on a given stroke, with relation to the glass and with relation to the arm, is predetermined and for satisfactory performance the arm should hold the connector of the blade at such position as to provide the same and correct angle for alternate strokes.

Where a windshield wiper arm is bent to hold the blade so that it will be aligned with the bottom of the windshield frame when the wiper is not in use, the curvature of the arm permits the arm to twist under the pressure of the spring which controls it. This twisting alters the predetermined angles above mentioned, in some instances to such an extent that the blade has too much angle on the stroke in one direction, with the result that the metal of the frame of the blade sometimes reaches the glass and scratches it; while on the alternate stroke the angle of relationship between the blade and the glass is too small to permit the blade to turn over and wipe properly. It is therefore an object of my invention to avoid these disadvantages of the prior art by providing an improved windshield wiper arm.

It is a further object of my invention to provide an improved windshield wiper arm with windshield wiper blade engaging means so that a single model arm may be used for both portions of a windshield.

Still another object of my invention is to provide an improved windshield wiper arm having at the free end thereof means for engaging the connector of a windshield wiper blade, which means may be positioned in any one of a number of positions thereby adapting the arm to any desired installation.

A still further object of my invention is to provide an improved windshield wiper arm having at the free end thereof means for engaging the connector of a windshield wiper blade, said means being adjustable to any one of a number of angular positions relative to the arm.

Another object of my invention is to provide an improved windshield wiper arm having at the free end thereof a windshield wiper blade connector engaging means which will prevent improper attachment of the windshield wiper blade to the arm.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which—

Figure 1:
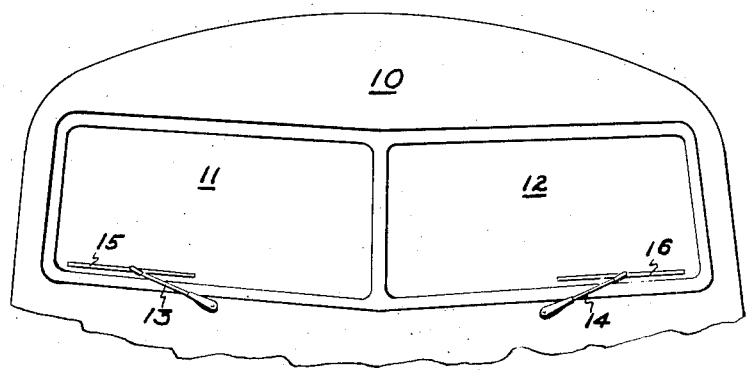
Fig. 1 shows the application of my improved windshield wiper arm to an automobile windshield of the type in common use at the present time.

Referring now particularly to Fig. 1, I have shown therein the top portion 10 of an automobile having a windshield comprising two portions 11 and 12 which are at angles to each other and at angles to a vertical. The windshield portions 11 and 12 are provided with windshield wiper arms 13 and 14 and windshield wiper blades 15 and 16 respectively. As will be apparent from this figure, each of the blades 15 and 16 in the inoperative position lies parallel to the lower edges of the windshield portions 11 and 12. Formerly this parallel position of the wiper blades with respect to the lower portions of the windshield was accomplished by bending the wiper arms, but in accordance with my invention I obtain this result by providing at the free ends of arms 13 and 14 an assembly for interlockingly engaging the connector of a readily detachable windshield wiper blade.

Figure 2:
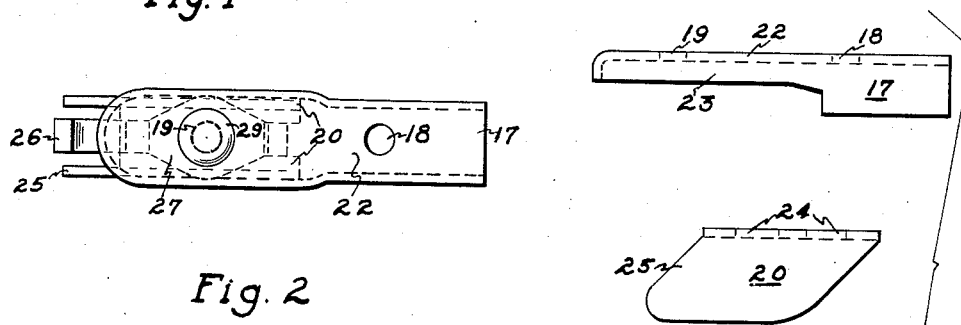
Fig. 2 shows the top view of the windshield wiper blade connector engaging means located at the free end of the windshield wiper arm.
Figure 3:
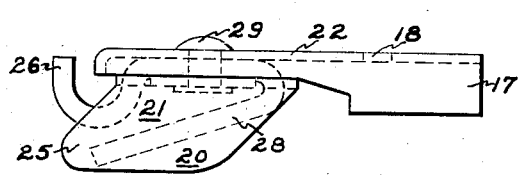
Fig. 3 shows a side view of the device shown in Fig. 2.

This assembly is shown in Figs. 2 and 3 wherein a top portion 17 is provided with an aperture 18 so that this top portion may be riveted or securely fastened to the free end of a windshield wiper arm such as 13. The top portion is furthermore provided with a second aperture 19 through which a rivet or other fastening means may be placed to hold into position the other portions of the assembly which comprise a channel shaped portion 20 and a hook member 21. By referring to the top portion of Fig. 5 it will be seen that the top member 17 has a base 22 from which there are depending sides 23 which serve as limit stops for the adjustment of the members 20 and 21.

Figure 5:
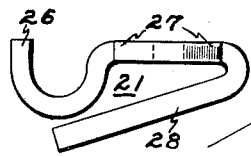
Fig. 5 is a view of the parts comprising the device in Figs. 2, 3, and 4.

By referring to the center portion of Fig. 5, together with Figs. 2 and 3, it will be seen that the member 20 comprises a base portion 24 and depending sides 25 which sides are adapted to engage the sides of a windshield wiper blade connector thereby to limit the degree of movement of the blade. By the term "connector" I mean to include any clip, clasp, bracket, fastener, or that portion of the windshield wiper blade frame, designed to permit the wiper blade to be attached in operative relation to the wiper arm. The lower portion of Fig. 5 shows the hook member 21 which has a hook portion 26, a base portion 27, and a depending portion 28. The hook portion in the assembled form is located between the depending sides 25 of the member 20. The base portion 27 rests upon the base portion 24 of the member 20 and engages the under side of the base portion 27 of the top member 17. The depending member 28 is formed to the position shown in Fig. 5 after the channel like member 20 has been placed into position. The depending member 28 serves to prevent improper installation of the wiper blade upon the wiper arm since generally the connectors on such wiper blades have apertures so positioned as to be displaced from the center of the connector. The base member 27 of the hook portion 21 has a width at the center which is equal to the distance between the two depending side members 23 of the top member 17. From this point of maximum width the base member 27 tapers down to the width of the hook portion 26 and the depending portion 28. The entire assembly of the hook member 21 and the channel like member 20 are maintained in pivotal frictional engagement with the top member 17 or the end of the wiper arm by means of a rivet 29.

Figure 4:
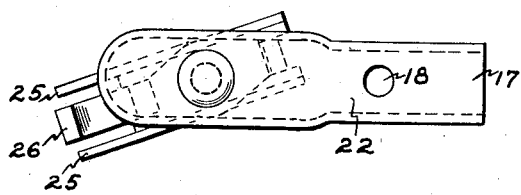
Fig. 4 shows the manner in which the device of Figs. 2 and 3 may be adjusted.

Due to the fact that the base portion 27 of the hook member 21 has portions which taper from a maximum width equal to the distance between the side members 23 of top member 17 to a minimum width equal to that of the hook portion 21; the channel member 20 and the hook member 21 may be adjusted to any one of a number of angular positions relative to the windshield wiper arm such as 13, as will be evident from Fig. 4. In Fig. 4 this assembly comprising the hook portion 21 and the channel member 20 has been adjusted to the maximum angle in one direction. Obviously, of course, these members may be moved to an equal angle toward the opposite side of the windshield wiper arm or to any intermediate position. Thus the side members 23 serve to limit the degree of angular adjustment of the blade or connector engaging means 21. While for the sake of clarity I have not shown further means other than the rivet 29 for maintaining the connector engaging assembly in adjusted position, it of course will be apparent to those skilled in the art that a series of radial corrugations or a plurality of detents may be provided for the various positions of adjustments, said radial corrugations or detents to be provided between the top of the base 27 of the hook portion 26 and the bottom of the base portion 22 of the top member 17. Furthermore, if desired, a spring member may be inserted between the top portion 17 and the hook portion 21.

Figure 6:
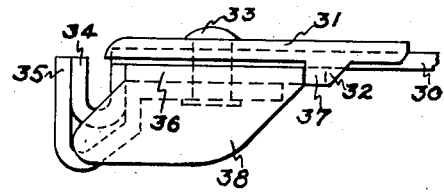
Fig. 6 shows a modification of my invention.

In Fig. 6 I have shown a modification of my invention embodying the same principles employed by the device shown in Figs. 2 to 5. In this figure the member 30 may comprise the outer free portion of a windshield wiper arm such as 13 or 14. Upon one extremity of the windshield wiper arm portion 30 there is placed a cap 31 having depending portions or ears 32 on each side of the arm 30. This cap portion 31 is maintained in a stationary position relative to the arm 30, and obviously the arm may be so constructed as to incorporate the functions of the cap portion 31. A rivet 33 or other suitable fastening means holds an adjustable assembly comprising a hook member 34 and an installation member 35. The hook member 34 as shown in this embodiment has a base portion 36 which at the end opposite the hook has a portion 37 of smaller width which at the limits of angular adjustment of the assembly engages one or the other of the depending ears or sides 32 of the cap 31. The hook member 34 furthermore is a unitary structure having combined therewith two depending sides 38 the function of which is similar to the sides 25 of the element 20 in the previous figures, and which serves to limit the degree of movement of the connector and the windshield wiper blade. The assembly member 35 which is located beneath the hook portion 34 has such configuration as to operate to prevent improper installation of the windshield wiper blade connector upon this assembly. By means of this assembly member 35 it will be found that a considerable portion of the windshield wiper blade connector will be located between the depending sides 38 thus providing proper operation of the blade in any of the adjusted positions of this assembly. In order that the adjustment remain relatively fixed due to the operation of detents, spring tension or the proper degree of friction, it is preferable to so form the arm 30 adjacent its free end so as to slightly bow the metal, as this metal is generally spring steel. By so bowing the extremity of the arm 30, sufficient spring tension will be available to maintain the hook member 34 in any adjusted position between the limits within which it may be adjusted.

My invention therefore has the advantages:

That a single model of arm may be used with a vast number of different models and different types of automobiles.

That it is not necessary to bend windshield wiper arms thereby forming right and left arms, and hence for replacement purposes a smaller stock may be carried.

That economy of manufacture is obtained through mass production of a single model for all styles and types of cars.

While I have shown and described my invention in connection with certain specific embodiments it will, of course, be understood that I do not wish to be limited thereto, since it is apparent that the principles herein disclosed are susceptible of being embodied in numerous modifications without departing from the spirit and scope of my invention as set forth in the appended claims.

What I claim as new and desire to secure by Letters Patent of the United States is:

1. The combination, in a windshield wiper arm adapted to be connected at one end thereof to a windshield wiper actuating mechanism, comprising means located adjacent the free end of said windshield wiper arm for engaging a readily detachable windshield wiper blade, said means being manually adjustable to fix said means in a selected predetermined angle relative to said arm, and frictional fastening means including a rivet for attaching said first means pivotally and in relatively fixed engagement with said arm whereby said means will hold said blade in the plane of travel of said blade in a selected angular position relative to said arm.

2. A windshield wiper arm provided with means pivotally and frictionally mounted at one of its ends for engaging a windshield wiper blade, said means being manually adjustable to fixedly hold said blade in any one of a plurality of positions with relation to said arm and in the plane of travel of said blade, said means including a hook adapted to engage said wiper blade.

3. The combination in windshield wiper arms each operatively related to a different portion of a windshield comprising attachment means having a base and depending sides adapted to limit the rocking movement of a wiper blade about the longitudinal axis thereof at the end of each stroke of the wiper arm, said attachment means being located adjacent the free end of each windshield wiper arm for interlockingly engaging the connector of a readily detachable windshield wiper blade to securely retain said blade on said arm during the operation thereof, said attachment means being secured to said arm by a pivotal connecting member fixed thereon whereby said attachment means may be manually adjusted to any one of a plurality of selected angular positions relative to said arm to cause said windshield wiper blade to be aligned with the frame of said windshield at one extremity of the movement of said arm, and means mounted on said arm for frictionally retaining said attachment means fixed in the position to which it is adjusted throughout the operation of said arm thereby to retain a windshield wiper blade in a selected angular position relative to said arm.

4. The combination in a windshield wiper arm of means attached to the free end of said arm for engaging a windshield wiper blade, said means being held in pivotal frictional engagement with said arm whereby said means may be relatively fixedly adjusted to any one of a plurality of angular positions relative to said arm, said means including a hook for engagement with said wiper blade, and means for limiting the degree of angular adjustment of said first mentioned means.

5. The combination in a windshield wiper arm of angularly adjustable means attached to the free end of said arm for engaging a windshield wiper blade, said means comprising a member pivotally mounted on said arm and having a base and depending sides, and fastening means positioned between the planes of said depending sides, said sides being adapted to limit the rocking movement of a wiper blade about the longitudinal axis thereof at the end of each stroke of the wiper arm.

6. The combination in a windshield wiper arm of angularly adjustable means attached to the free end of said arm for engaging a windshield wiper blade, said means comprising a hook, a channel member cooperating with said hook, said hook being located within said channel member and being adapted to engage said blade, said channel member having depending sides for limiting the degree of rocking movement about the longitudinal axis of the blade at the end of each operating stroke, and means for limiting the degree of angular adjustment of said first mentioned means.

7. In a windshield wiper arm adapted to be operatively related to either the right or left portion of a windshield, the combination comprising a hook and channel member assembly for engaging the connector of a readily detachable windshield wiper blade, said assembly being pivotally mounted upon the free end of the windshield wiper arm so as to be manually adjustable relative to said arm to cause a windshield wiper blade to be aligned with the frame of the windshield, and means including a rivet for frictionally securing said assembly to said arm to maintain said assembly to adjusted position.

8. The combination in a windshield wiper arm adapted to be connected at one end thereof to a windshield wiper actuating mechanism, comprising angularly adjustable means pivotally attached to the free end of said arm for engaging a readily detachable windshield wiper blade, said means comprising a member having a base with depending sides and a hook positioned therebetween, said sides being adapted to limit the rocking movement of a wiper blade about the longitudinal axis thereof at the end of each stroke of said arm, said means being adjustable to position said means and a wiper blade attached thereto in a selected predetermined angle relative to said arm, means for limiting the degree of adjustment of said first means, and means for retaining said first means in adjusted predetermined angular relationship to said arm throughout the operation thereof.

9. The combination in a windshield wiper arm adapted to be connected at one end thereof to a windshield wiper actuating mechanism, comprising angularly adjustable means located adjacent to the free end of said arm for receiving a readily detachable windshield wiper blade, said means comprising a member having a base with spaced means depending therefrom, said spaced means being adapted to limit the movement of the wiper blade with respect to said arm, means carried by said angularly adjustable means for receiving the connector of a wiper blade to connect said blade and arm into cooperative relationship with each other, means for pivotally attaching said first means to said arm and means for retaining said first means and a wiper blade attached thereto fixed at a selected predetermined angle relative to said arm.

JOHN W. ANDERSON.